Patented Nov. 20, 1928.

1,692,695

UNITED STATES PATENT OFFICE.

WILLIAM JACKSON POPE, OF CAMBRIDGE, ENGLAND, ASSIGNOR TO THE BRITISH DRUG HOUSES, LIMITED, OF LONDON, ENGLAND, A BRITISH COMPANY.

ANÆSTHETIC AND PROCESS FOR MANUFACTURING SAME.

No Drawing. Application filed March 18, 1926, Serial No. 95,785, and in Great Britain July 28, 1925.

This invention relates to the manufacture of compounds for producing local anæsthesia which are of higher efficiency than that of the anæsthetic bases and their salts commonly used or known to be useful for the purpose.

Salts of naturally occurring alkaloids, as for example cocaine, and of certain organic basic substances, which are prepared artificially, as for example ethocaine (di-ethyl-amino-ethyl-para-amino-benzoate), are in extensive use as anæsthetics. The acids in general chosen for the preparation of these salts are such as yield easily soluble and well-characterized salts.

It has been discovered that the borates of anæsthetic bases (the term "anæsthetic base" as used in the present specification and claims meaning a natural or synthetic amino-base known to have an anæsthetic action, and including amino-bases having an unsubstituted amino-group as well as bases having an amino-group in which one or both hydrogen atoms have been replaced by organic radicals) exert a far greater anæsthetic effect when applied in solution to a sensitive surface, such as that of the eye, nose, throat or ureter, than do solutions of the salts commonly used.

The chemical composition of these borates is such that one molecular proportion of the alkaloid or base is associated with five atomic proportions of boron, in the form of a complex boric acid, and in certain cases, especially if acetone is used in their preparation, solvent of crystallization may be included in their composition.

My invention relates to those borates of natural or synthetic bases exercising anæsthetic effect which are the products of my invention and are hereinafter defined and included by the expression "borates of anæsthetic bases."

These borates are made by combining the alkaloid or base, both of which are hereinafter included in the term "base", with boric acid. In the preferred method chemical reaction between the base and boric acid is caused to occur in solution under such conditions that the borate eventually separates from the solution. The base is dissolved in a boiling organic solvent, such as acetone, and to the hot solution there is added a solution of boric acid, preferably in the required molecular proportion by weight, also in a boiling organic solvent, such as acetone. The whole is then cooled or allowed to cool, after filtration if necessary, whereupon the borate crystallizes. If the organic solvent employed retains in solution most or all of the borate of the anæsthetic base, the borate may be precipitated by addition of acetone, ether, or other suitable miscible solvent. The supernatant liquor is removed and the borate is then obtained in a state sufficiently pure for pharmaceutical use. In the event of the borate having a solubility of such an order that little or no separation of borate occurs after mixing the solutions, then concentration of the solution may be resorted to as a convenient method for obtaining the separation of the desired borate.

Other processes of manufacture which are chemically equivalent to the above, as for example double decomposition of the sulphate of the base with a barium salt of boric acid, may be employed.

By this method the sulphate of the base is mixed with an excess of a barium borate to remove the sulphuric acid from the sulphate of the base. The barium sulphate is filtered and thoroughly washed with alcohol. The clear filtrate is evaporated to a very low volume or to dryness and then thoroughly washed with acetone, or other suitable solvent, to give the desired borate.

The invention is illustrated by the following examples, but the invention is not limited thereto. The parts are by weight.

*Example 1.*—Amydricaine (tetramethyldiamino-dimethyl ethyl carbinyl benzoate) borate.

2.78 parts of amydricaine base, of which the structural formula is:

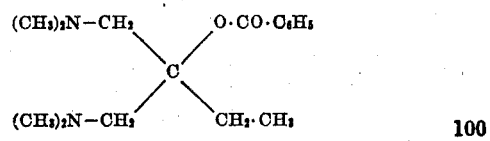

are dissolved in 11 parts of acetone, and there is added to this a solution of 3.1 parts of boric acid in 250 parts of hot acetone. The borate separates on cooling, and is filtered and washed with a little acetone. The product so obtained has a $P_H$ value of about 8.2 when freshly diluted with about 50 volumes of water, using phenol red solution as an indicator.

By another method, 1 part of amydricaine base is dissolved in N-sulphuric acid (3.2 parts approximately) and this solution is added to an aqueous suspension of a barium borate prepared by mixing 1.05 parts of crystalline barium hydroxide with 0.83 parts of boric acid. After warming for a short time the insoluble material is filtered and washed with warm alcohol. The filtrate and washings are mixed and evaporated and the residue is washed with acetone. The $P_H$ value of this material is also about 8.2 when tested by the method given above.

*Example 2.—Ethocaine diethylaminoethyl-para-aminobenzoate borate.*

1 part of crystalline ethocaine (containing one molecule of water of crystallization) is dissolved in about 4 parts of acetone, and there is added to this a solution of 1.22 parts of boric acid dissolved in about 96 parts of boiling acetone, being five molecular proportions of boric acid to one molecular proportion of crystalline ethocaine base. The borate which separates after cooling is washed with a little acetone. The product so obtained has a $P_H$ value of about 8.2 when freshly diluted with about 50 volumes of water, using phenol red as an indicator.

By another method 1.27 part of ethocaine base, of which the structural formula is:

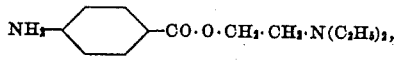

is dissolved in N-sulphuric acid (5 parts approximately), and this solution is added to an aqueous suspension of a barium borate prepared by mixing 1.57 parts by weight of crystalline barium hydroxide with 1.24 parts by weight of boric acid. After warming for a short time the insoluble material is filtered and washed with warm alcohol. The filtrate and washings are mixed and evaporated, and the residue is washed with acetone, filtered, washed with more acetone, and dried. The $P_H$ value of this material is also about 8.2 when tested in the manner described above.

*Example 3.—Benzamine (benzoyl vinyl diacetonalkamin) borate.*

1.25 parts of benzamine base having the structural formula:

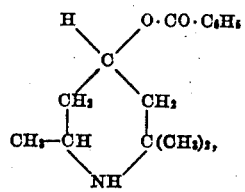

are dissolved in about 4 parts of acetone, and there is added to this a solution of 1.5 parts of boric acid in 120 parts of boiling acetone, being five molecular proportions of boric acid to one molecular proportion of benzamine base. The borate separates on cooling and is filtered and washed with a little acetone. The product so obtained has a $P_H$ value of about 8.2 when freshly diluted with about 50 volumes of distilled water, and using phenol red solution as the indicator.

By another method, 2.47 parts of benzamine base are dissolved in N-sulphuric acid (10 parts approximately), and this solution is added to an aqueous suspension of a barium borate prepared by mixing 3.15 parts of crystalline barium hydroxide with 2.48 parts of boric acid. After warming for a short time the insoluble material is separated and washed with warm alcohol. The filtrate and washings are mixed and evaporated and the residue is washed with acetone, the solid separated and washed with more acetone. The $P_H$ value of the material so obtained is also about 8.2 when tested in the manner described above, again using phenol red as an indicator.

*Example 4.—Butyn (dibutylaminopropyl para-amino-benzoate) borate.*

The preparation of this substance is carried out in a similar way, except that an equivalent of butyn base, of which the structural formula is:

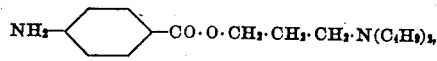

is used in place of the other base mentioned. The $P_H$ value of this salt is about 7.6 when freshly diluted with about 50 volumes of ordinary distilled water and using phenol red solution as indicator, the same method of testing being adopted as in the previous examples.

In a similar manner one may prepare:

From cocaine (benzoyl methyl ecgonine), of which the structural formula is

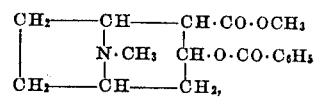

cocaine borate, the $P_H$ value being about 7.0, using bromothymol blue as the indicator, and when freshly diluted with about 50 volumes of ordinary distilled water;

From amylocaine base, of which the structural formula is

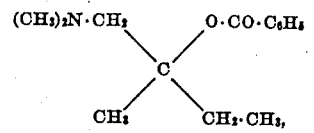

amylocaine (dimethylaminomethyl methyl ethyl carbinyl benzoate) borate having a $P_H$ value of about 8.0, using phenol red solution as indicator, under the conditions described for the previously mentioned borates;

From glycocaine base, of which the structural formula is

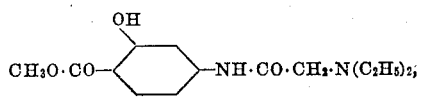

glycocaine (methyl diethylamino-acetyl-para-amino-ortho-hydroxy-benzoate) borate having a $P_H$ value of about 7.6, using phenol red solution as indicator, and using the same dilution as before, and observing similar conditions;

From benzocaine base, of which the structural formula is

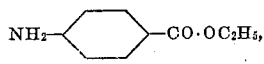

benzocaine (ethyl para-amino-benzoate) borate, having a $P_H$ value of about 6.1, using bromothymol blue solution as indicator;

From phenocaine base, of which the structural formula is

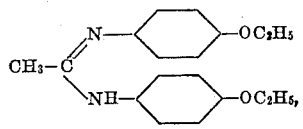

phenocaine (di-para-phenetyl ethenylamidine) borate, having a $P_H$ value of about 7.3, using phenol red as indicator.

In the preparation of the borates of amylocaine, glycocaine, benzocaine and phenocaine by causing the base to react with boric acid in hot acetone solution, it is necessary to distil away a portion of the solvent, this being the most convenient method of ensuring separation of the required borate.

Having thus described the nature of my invention and the best means I know for carrying the same into practical effect, what I claim as my invention is:—

1. As a new article of manufacture a borate of an anæsthetic base which borate has a composition of approximately one molecular proportion of the base to 5 molecular proportions of boric acid and has in solution a high anæsthetic effect when applied to a sensitive surface.

2. As a new article of manufacture ethocaine diethylaminoethyl-para-aminobenzoate borate having a composition of approximately one molecular proportion of ethocaine to 5 molecular proportions of boric acid and having in solution a high anæsthetic effect when applied to a sensitive surface.

3. A process for the manufacture of borates of anæsthetic bases which consists in causing an anæsthetic base to react with boric acid in the proportion of approximately one molecular proportion of the base to five molecular proportions of boric acid.

4. A process for the manufacture of borates of anæsthetic bases which consists in mixing hot solutions in acetone of the base and boric acid, allowing the mixture to cool and separating from the liquid the crystals which have been formed.

5. A process for the manufacture of borates of anæsthetic bases which consists in mixing hot solutions in acetone of the base and boric acid in the proportion of approximately one molecular proportion of the base to five molecular proportions of boric acid, allowing the mixture to cool and separating from the liquid the crystals which have been formed.

6. A process for the manufacture of a borate of ethocaine diethylaminoethyl-para-aminobenzoate, which consists in causing ethocaine diethylaminoethyl-para-aminobenzoate to react with boric acid in the proportion of one molecular proportion of ethocaine to five molecular proportions of boric acid.

7. A process for the manufacture of a borate of ethocaine diethylaminoethyl-para-aminobenzoate which consists in mixing hot solutions in acetone of ethocaine diethylaminoethyl-para-aminobenzoate and boric acid, allowing the mixture to cool and separating from the liquid the crystals which have been formed.

8. A process for the manufacture of borates of anæsthetic bases which consists in causing an anæsthetic base dissolved in an organic solvent to react with boric acid dissolved in an organic solvent.

9. A process for the manufacture of borates of anæsthetic bases which consists in causing an anæsthetic base dissolved in acetone to react with boric acid dissolved in acetone.

10. A process for the manufacture of borates of ethocaine which consists in causing ethocaine dissolved in an organic solvent to react with boric acid dissolved in an organic solvent.

11. A process for the manufacture of borates of ethocaine which consists in causing ethocaine dissolved in acetone to react with boric acid dissolved in acetone.

In testimony whereof I have signed my name to this specification.

WILLIAM JACKSON POPE. [L. S.]